(12) United States Patent
Huber et al.

(10) Patent No.: US 10,655,535 B2
(45) Date of Patent: May 19, 2020

(54) CONNECTING ROD FOR AN INTERNAL COMBUSTION ENGINE WITH VARIABLE COMPRESSION

(71) Applicant: ECO Holding 1 GmbH, Marktheidenfeld (DE)

(72) Inventors: David Huber, Aschaffenburg (DE); Dietmar Schulze, Muenzenberg (DE); Alexander Mudra, Marktheidenfeld (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 69 days.

(21) Appl. No.: 15/997,424

(22) Filed: Jun. 4, 2018

(65) Prior Publication Data
US 2018/0371986 A1    Dec. 27, 2018

(30) Foreign Application Priority Data

Jun. 23, 2017  (DE) .................. 10 2017 113 951
Feb. 15, 2018  (DE) .................. 10 2018 103 387

(51) Int. Cl.
*F02B 75/04* (2006.01)
*F16C 7/06* (2006.01)
(Continued)

(52) U.S. Cl.
CPC .......... *F02B 75/045* (2013.01); *B21K 25/005* (2013.01); *B23K 20/12* (2013.01);
(Continued)

(58) Field of Classification Search
CPC ........ F02B 75/04; F16C 7/06; F16C 11/0623; F16C 11/0685; F16C 11/069; F02D 15/02; B21K 1/766; F15B 5/06
(Continued)

(56) References Cited

U.S. PATENT DOCUMENTS 4,146,340 A  *  3/1979  Smith, Jr. ................ B62D 7/20
                                            403/27
5,065,934 A  *  11/1991 Ito ........................ B23K 20/129
                                            228/114.5
(Continued)

FOREIGN PATENT DOCUMENTS

DE          19812532 A1    9/1999
DE      102015103463 A1    1/2014
(Continued)

OTHER PUBLICATIONS

English Machine Translation of DE19812532 Provided by Espacenet (Year: 2019).*

(Continued)

*Primary Examiner* — Jacob M Amick
*Assistant Examiner* — Michael A Kessler
(74) *Attorney, Agent, or Firm* — Von Rohrscheidt Patents (57) ABSTRACT

A connecting rod for a variable compression internal combustion engine, the connecting rod including a crank bearing eye configured to connect the connecting rod to a crankshaft of the variable compression internal combustion engine; a connecting rod bearing eye configured to connect the connecting rod to a cylinder piston of the variable compression internal combustion engine; an eccentrical element adjustment arrangement configured to adjust an effective connective rod length, which eccentrical element adjustment arrangement includes an eccentrical element that is connected torque proof with an eccentrical element lever, wherein a wrist pin of the cylinder piston is receivable in the eccentrical element, wherein the eccentrical element adjustment arrangement includes two hydraulic chambers respectively including a piston that is movably arranged in a cylindrical borehole and connected with a support rod which is connected with the eccentrical element lever at another (Continued)

(A-A)

end, wherein the support rod is configured from plural components.

11 Claims, 4 Drawing Sheets

(51) Int. Cl.

| | | |
|---|---|---|
| *F15B 15/06* | (2006.01) | |
| *F16C 11/06* | (2006.01) | |
| *B23K 20/12* | (2006.01) | |
| *B21K 25/00* | (2006.01) | |
| *B23K 20/227* | (2006.01) | |
| *B21K 1/76* | (2006.01) | |
| *F15B 11/20* | (2006.01) | |
| *B23K 101/00* | (2006.01) | |
| *B23K 103/18* | (2006.01) | |
| *B23K 103/04* | (2006.01) | |

(52) U.S. Cl.
CPC .......... *B23K 20/129* (2013.01); *B23K 20/227* (2013.01); *F15B 15/06* (2013.01); *F16C 7/06* (2013.01); *F16C 11/069* (2013.01); *F16C 11/0623* (2013.01); *B21K 1/766* (2013.01); *B23K 2101/003* (2018.08); *B23K 2101/006* (2018.08); *B23K 2103/04* (2018.08); *B23K 2103/18* (2018.08); *F15B 11/20* (2013.01); *F15B 2211/7107* (2013.01); *F16C 2360/22* (2013.01)

(58) Field of Classification Search
USPC .............................................. 123/48 B, 197.3
See application file for complete search history.

(56) References Cited

U.S. PATENT DOCUMENTS

| | | | | |
|---|---|---|---|---|
| 2004/0025446 | A1* | 2/2004 | Suzuki | ....................... B21J 5/02 |
| | | | | 52/27 |
| 2015/0059683 | A1* | 3/2015 | Schulze | ................ F02B 75/045 |
| | | | | 123/197.3 |
| 2015/0233288 | A1* | 8/2015 | Paul | ..................... F02B 75/045 |
| | | | | 123/48 B |

FOREIGN PATENT DOCUMENTS

| | | |
|---|---|---|
| DE | 102013014090 A1 | 3/2015 |
| DE | 102015109924 A1 | 9/2016 |
| DE | 102015109580 A1 | 10/2016 |
| DE | 102015213278 A1 | 1/2017 |
| EP | 2843209 A1 | 3/2015 |

OTHER PUBLICATIONS

English Machine Translation of DE102015213278 Provided by Espacenet (Year: 2019).*

* cited by examiner

CONNECTING ROD FOR AN INTERNAL COMBUSTION ENGINE WITH VARIABLE COMPRESSION

RELATED APPLICATIONS

This application claims priority from and incorporates by reference German patent applications DE 10 2017 113 951.6 filed on Jun. 23, 2017, and DE 10 2018 103 387.7 filed on Feb. 15, 2018

FIELD OF THE INVENTION

The invention relates to a connecting rod for an internal combustion engine with an eccentrical adjustment arrangement for adjusting an effective connecting rod length and the invention relates to an internal combustion engine with an adjustable combustion ratio using the connecting rod.

BACKGROUND OF THE INVENTION

In internal combustion engines a high compression ratio has a positive effect upon an efficiency of the internal combustion engine. Compression ratio is typically defined as a ratio of an entire cylinder cavity before compression to a remaining cylinder cavity after compression. In internal combustion engines with external ignition, in particular gasoline engines that have a fixed compression ratio, the compression ratio, however, may only be selected high enough so that a so-called "knocking" of the internal combustion engine is prevented during full load operations. However, for much more prevalent partial load operations of the internal combustion engine, thus for a lower cylinder charge the compression ratio can be selected at a higher level without "knocking" occurring. The important partial load operations of an internal combustion engine can be improved when the compression ratio is variably adjustable. In order to adjust the compression ratio systems with variable connecting rod links are known which actuate an eccentrical adjustment arrangement of a connecting rod by hydraulically or mechanically actuatable switch valves.

A generic connecting rod of this type is known from DE 10 2015 103 463 A1.

BRIEF SUMMARY OF THE INVENTION

Thus, it is an object of the invention to provide an improved economical connecting rod for mass production of a variable compression internal combustion engine wherein the connecting rod is producible in a reliable process.

It is another object of the invention to provide a variable compression internal combustion engine with the connecting rod.

The object is achieved by a connecting rod for a variable compression internal combustion engine, the connecting rod including a crank bearing eye configured to connect the connecting rod to a crankshaft of the variable compression internal combustion engine; a connecting rod bearing eye configured to connect the connecting rod to a cylinder piston of the variable compression internal combustion engine; an eccentrical element adjustment arrangement configured to adjust an effective connective rod length, which eccentrical element adjustment arrangement includes an eccentrical element that is connected torque proof with an eccentrical element lever, wherein a wrist pin of the cylinder piston is receivable in the eccentrical element, wherein the eccentrical element adjustment arrangement includes two hydraulic chambers respectively including a piston that is movably arranged in a cylindrical borehole and connected with a support rod which is connected with the eccentrical element lever at another end, and wherein the support rod is configured from plural components.

The object is also achieved by a method for producing the connecting rod described supra, the method including the steps producing a support rod including a pivot link element, a rod element and a piston connector; attaching at least the pivot link element or at least the piston connector at least at one end of the rod element; and establishing a fixed connection therewith.

The object is also achieved by a variable compression internal combustion engine, comprising at least one connecting rod described supra.

Advantageous embodiments and advantages of the invention can be derived from the dependent claims, the description and the drawing figure.

According to one aspect of the invention a connecting rod for a variable compression internal compression engine is proposed, the connecting rod comprising a crank bearing eye for connecting the connecting rod to a crankshaft of the internal combustion engine, a connecting rod bearing eye for connecting the connecting rod to a cylinder piston of the internal combustion engine, an eccentrical element adjustment arrangement for adjusting an effective connective rod length, wherein the eccentrical element adjustment arrangement includes an eccentrical element that is connected torque proof with an eccentrical element lever wherein a wrist pin of the cylinder piston is receivable in the eccentrical element. The eccentrical element adjustment arrangement includes two hydraulic chambers respectively including a piston that is moveably arranged in a cylindrical borehole and connected with a support rod which is connected with the eccentrical element lever at another end. The support rod is configured in plural components.

Thus, it is advantageously possible to produce a more economical, lighter and more robust support rod that is optimized for mass production and a support rod piston assembly and thus an improved connecting rod.

According to the invention an advantageous geometry of the support rod can be achieved. Instead of using a turned and milled component that is made from solid material the support rod is assembled from three components: pivot link element, rod element and piston connector which can be advantageously configured as a ball in order to achieve a maximum amount of articulation in the connection of the support rod with the piston. Thus, the ball can be connected by a welding process, friction welding or another suitable welding process with the rod element. The pivot link element can be connected with the rod element through a suitable welding method, e.g., laser welding. The mounting sequence, however, can also be inverted. The pivot link element can also be implemented as a ball connection. The rod element can be made from a solid material or as a hollow bushing or it can be made from a tube. For this purpose, a standard tube or a cylindrical steel rod can be used. By the same token the rod element can have a cross section that differs from a circle that is provided with standard cylindrical bar stock or it can have a polygonal shape or another profile which can have an area moment that is advantageously optimized for bending stiffness. According to another embodiment the support rod can also be provided in two components and can be made from a pivot link element and a ball rod, wherein the ball is configured as a piston connector and the rod element can be configured as an individual turned component.

In combination with the implemented support rod a support piston without a safety ring can be used, so that the support rod assembly can include a two-piece piston.

Advantageously the components of the support rod (piston connector, pivot link element, rod element) as well as the components of the support piston (ball receiver and piston) can be configured as turned components or standard components so that the entire assembly can be produced in an economical manner.

Friction welding is an economical production method in particular for mass production, thus the pistons of the connecting rod are producible quite well by an automated high-volume assembly process.

Through the configuration without safety ring the assembly step "insert the safety ring" as well as the component safety ring can be omitted. Thus, no undercuts are required in the support piston geometry. Thus, the support piston can be measured during mass production in its entirety by a nondestructive process which provides reliable quality assurance.

Using rod profiles with higher area moments facilitates making the support rod more robust with respect to bending loads and overall lighter. This has a positive and weight reducing effect upon oscillating masses of the internal combustion engine.

Advantageously a reliably producible connection e.g., by laser welding, of the two-piece piston can be provided with the support rod allowing maximum force transmission of the hydraulic medium since the pressure force on the surface of the piston is completely converted into a linear force in a direction of the rod element.

A two-piece piston made from the piston bushing and the cover facilitates using gaskets that have little elasticity like e.g., metal rings or rings made from a highly temperature resistant thermoplastic material like e.g., polyether ketone (PEEK), so that seal tightness of the piston can be improved.

The ball configured as a piston connector can be made e.g., from hardened steel, the rod element can be made from heat treatable steel and can be welded to the hardened ball. Advantageously hardened portions of the ball can be protected against annealing from the high welding temperatures by selective cooling.

The pivot link element can be formed with an impressed bearing bushing e.g., made from bronze. In another embodiment the bronze bushing can also be connected with the rod element directly.

According to an advantageous embodiment the support rod can be configured as an assembled support rod. Advantageously the support rod can be assembled in a modular manner from simple components, instead of being produced by complex turning and milling processes. Suitable materials can be advantageously used for the pivot link element, the rod element and the piston connector which can be connected with little complexity by different suitable joining processes.

According to an advantageous embodiment the support rod can include a rod element with a pivot link element at one end and a piston connector at another end, wherein the rod element can be connected with the pivot link element or with the piston connector by a welding method, in particular a friction welding method. Advantageously the friction welding method can be used to connect components made from different materials. Friction welding is an economical joining method which is suitable for connecting components with different geometric shapes.

According to an advantageous embodiment the piston connector can be configured as a ball. A ball provides a high level of geometric freedom when connecting the piston. Thus, fabrication tolerances can be compensated in a suitable manner during subsequent operations. In particular the ball can be hardened at least in locations where it is important in order to prevent wear.

According to an advantageous embodiment the pivot link element can be configured as a ball. A ball configured as a pivot link element provides a suitable and economical connection component between the support rod and the eccentrical element lever. This way a high level of geometric freedom can be provided for the movement of the eccentrical element lever. Fabrication tolerances can be compensated advantageously.

Advantageously the pivot link element as well as the piston connector can be configured as a ball which are connected with both ends of the rod element, e.g. by a friction welding process. This embodiment can be advantageously implemented in conjunction with a one-piece eccentrical element lever that is produced by a metal powder injection molding process (MIM) or by a precision casting method.

According to an advantageous embodiment the pivot link element can be configured as a sleeve whose longitudinal axis is configured perpendicular to the longitudinal axis of the rod element. In particular the pivot link element can include an impressed bearing bushing. Through this embodiment of the pivot link element the connection between the support rod and the eccentrical element lever can be configured with low friction so that reliable operations of the connecting rod are provided. In particular the sleeve can be made from bronze and/or the sleeve can include a low-friction coating.

According to an advantageous embodiment the rod element can be configured as a tube. The tube is a very economical component since standard products are available. Furthermore, a tube configured as a standard component has lower weight compared to a solid material component combined with a high bending stiffness.

According to an advantageous embodiment a cross section of the rod element can be configured polygonal. This way rod elements can be advantageously produced with an area moment that provides good bending stiffness. The polygonal shape can be suitably adapted to force requirements. Various geometries are also available as standard components According to an advantageous embodiment the piston connector can be secured with a safety ring against sliding out of the piston. This way a secure connection can be established between the piston connector and the piston which also provides a long-term secure connection.

According to an advantageous embodiment the piston can include an undercut which secures the piston connector against sliding out. Thus, the piston connector can be fixated by the cover in the piston. An alternative embodiment of this type allows omitting the safety ring. Furthermore, this embodiment of the piston facilitates providing a permanent connection between the piston and the support rod which also avoids wear of the safety ring that would be possible otherwise and could lead to a failure of the connection.

According to an advantageous embodiment the cover can be connected with the piston by welding or a fold over or by impressing. Thus, the cover can be connected with the piston in a rather simple and reliable manner and can thus secure a reliable and permanent connection between the piston and the support rod.

According to an advantageous embodiment the rod element can be integrally configured in one piece together with the pivot link element. A support rod of this type represents an advantageous alternative with a directly integrally formed pivot link element. In particular the pivot link element can be configured as a ball, so that a ball rod can be used.

According to another aspect of the invention a method for producing a connecting rod is proposed, the method comprising the steps: producing a support rod with a pivot link element, rod element and piston connector, attaching at least the pivot link element or at least the piston connector at least at one end of the rod element with the pivot link element or the piston connector and fixing it thereto. This way the support rod can be configured as an assembled support rod. Advantageously the support rod can thus be assembled from simple components in a modular manner instead of being produced as a turned or milled component in complex processes. Suitable materials can be advantageously provided for the components pivot link element, rod element and piston connector, which can then be connected easily by suitable connection processes. Advantageously the components of the support rod (piston connector, pivot link element, rod element) as well as the components of the support piston (ball receiver and piston) can be configured as turned components or standard components so that the entire assembly can be produced in an economical manner.

According to an advantageous embodiment the support rod can be connected at least with the pivot link element and/or at least with the piston connector by a welding method, in particular a friction welding method. The friction welding method represents a cost-effective joining method in particular for high-volume production processes. Thus, the pistons of the connecting rod can be advantageously produced by a high-volume assembly process.

According to an advantageous embodiment the rod element can be produced integrally in one piece together with the pivot link element or the piston connector and/or the piston connector or the pivot link element can be connected as a separate component with the rod element. This way the mounting process of the support rod can be simplified in a suitable manner while using the advantage of an at least partially assembled support rod. The separate component with the desired properties can be selected in an optimization process.

According to an advantageous embodiment a piston can be slid onto the rod element before completing the rod element and the piston connector with the slid-on piston can be connected with the rod element. Thereafter the piston can be closed with a cover, for example welded together. This way the rod element can be connected with the piston in a simple fabrication process. Furthermore, the subsequent connection of the piston connector with the piston facilitates a secure and long-term reliable connection to form a support rod. Thus, a separate safety ring in the piston can be omitted in a reliable manner.

According to another aspect of the invention an internal combustion engine with at least one connecting rod is proposed. Thus, it is possible to use the improved connecting rod described supra which includes a multi-component, more economical, lighter and more robust support rod or support rod-piston-assembly that is optimized for mass production. Thus, an advantageous combustion process and therefore lower fuel consumption can be implemented in the internal combustion engine.

BRIEF DESCRIPTION OF THE DRAWINGS

Further advantages can be derived from the subsequent drawing description. The drawing illustrates an embodiment of the invention. The drawings, the description and the claims include several features in combination. A person skilled in the art will advantageously view the features also individually and will combine them into additional useful combinations, wherein:

DETAILED DESCRIPTION OF THE INVENTION

In the drawing figures like or similar components are designated with identical reference numerals. The drawing figures merely illustrate exemplary embodiments and do not limit the spirit and scope of the invention.

FIGS. 1-4 schematically illustrate a connecting rod 1 for a variable compression internal combustion engine with an eccentrical element adjustment arrangement 2 for adjusting an effective connecting rod length which is defined as a distance of a center axis of a crank bearing eye 12 from a center axis of a borehole of the eccentrical element 4. The connecting rod 1 can assume two positions, namely for high compression $\varepsilon_{high}$ and low compression $\varepsilon_{low}$.

The connecting rod 1 includes a crank bearing eye 12 for connecting the connecting rod 1 with a crank shaft of an internal combustion engine, a connecting rod bearing 13 for connecting the connecting rod 1 with a cylinder piston of the internal combustion engine, an eccentrical element adjustment arrangement 2 for adjusting an effective connecting rod length.

The eccentrical element adjustment arrangement 2 includes an eccentrical element 4 that cooperates with a single component or multi-component eccentrical element lever 3 in which a non-illustrated wrist pin of a cylinder piston is received during operations. An adjustment travel of the eccentrical element adjustment arrangement 2 is adjustable by a switch valve 5.

A rotation of the adjustable eccentrical element adjustment arrangement 2 can be initiated by an impact of mass forces (at low compression $\varepsilon_{low}$) and gas load forces (at high compression $\varepsilon_{high}$) of the internal combustion engine which impact the eccentrical element adjustment arrangement 2 during an operating stroke of the internal combustion engine. Effective directions of forces impacting the eccentrical element adjustment arrangement 2 change continuously during an operating stroke. The rotating movement or adjustment movement is supported by one or plural pistons 6, 7 that are loaded with hydraulic fluid, in particular motor oil and integrated in the connecting rod 1 or the pistons 6, 7 prevent a resetting of the eccentrical element adjustment arrangement 2 caused by varying force effective directions of forces impacting the eccentrical element adjustment arrangement 2.

The pistons 6, 7 are respectively moveably supported in a cylinder bore 8, 9 of a hydraulic cylinder of the connecting rod 1 and connected with support rods 10, 11 which are in turn pivotably linked with the eccentrical element lever.

The connecting rod 1 includes the crank bearing eye 12 for connecting the connecting rod 1 with a crankshaft of an internal combustion engine and a connecting rod bearing eye 13 for connecting the connecting rod 1 with the cylinder piston of the internal combustion engine.

The pistons 6, 7 are moveably arranged in hydraulic chambers 14, 15 that are formed by the cylinder boreholes 8, 9 and loaded through inlets 16, 17 from the crank bearing eye 12 with hydraulic fluid, e.g., motor oil through check valves 18, 19. The check valves prevent a flowback of the hydraulic fluid from the hydraulic chambers into the inlets 16, 17 but they facilitate a pulling of the hydraulic fluid into the hydraulic chambers 14, 15. The hydraulic chambers 14, 15 are connected with the switch valve 5 through drains that are not illustrated in more detail wherein the switch valve can be configured as a hydraulic valve or as a mechanical valve and is connected through a drain conduit with the crank bearing eye 12.

Figure 1:
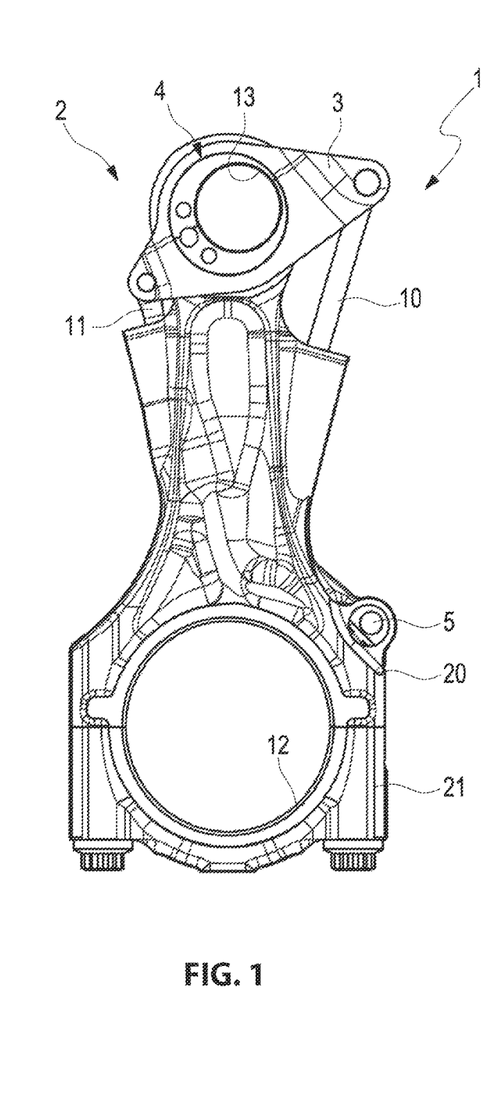
FIG. 1 illustrates a front view of a first embodiment of a connecting rod according to the invention.
Figure 2:
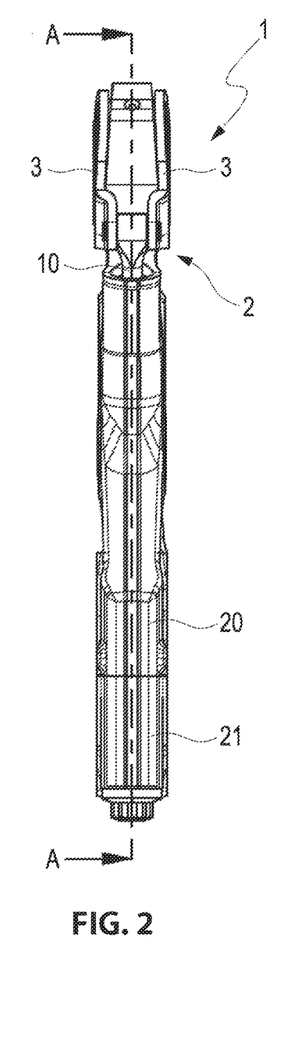
FIG. 2 illustrates a side view of the connecting rod according to FIG. 1 with an illustrated sectional plane A-A.
Figure 3:
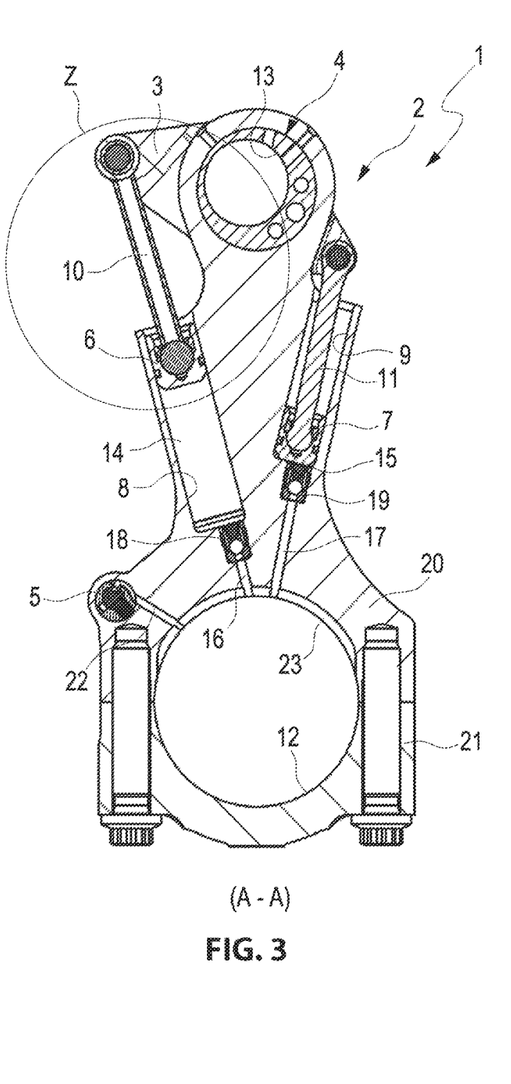
FIG. 3 illustrates a sectional view of the connecting rod along the sectional plane A-A according to FIG. 2.

As evident e.g. from FIG. 3 the connecting rod 1 includes a connecting rod body 20 and a connecting rod cover 21 connected thereto.

A groove 23 is provided on a circumference of the crank bearing eye 12 in the portion of the connecting rod body 20, wherein the inlets 16, 17 and the drain conduit lead into the groove. Since the groove 23 is only arranged on a portion of a circumference of the crank bearing eye 12 a load bearing capability of the bearing in the crank bearing eye 12 is impaired as little as possible.

The configuration of the described piston rod 1 is only illustrated in an exemplary manner and the eccentrical element lever connection according to the invention can also be used in other embodiments of a connecting rod with an eccentrical element adjustment arrangement. Thus, it is also possible for example to arrange the check valve 5 in a portion of the connecting rod cover 21. Furthermore, the described check valves 18, 19 can also be provided integrated in the switch valve 5. Also, the hydraulic supply of the hydraulic chambers 14, 15 can deviate from the described embodiment.

Figure 4:
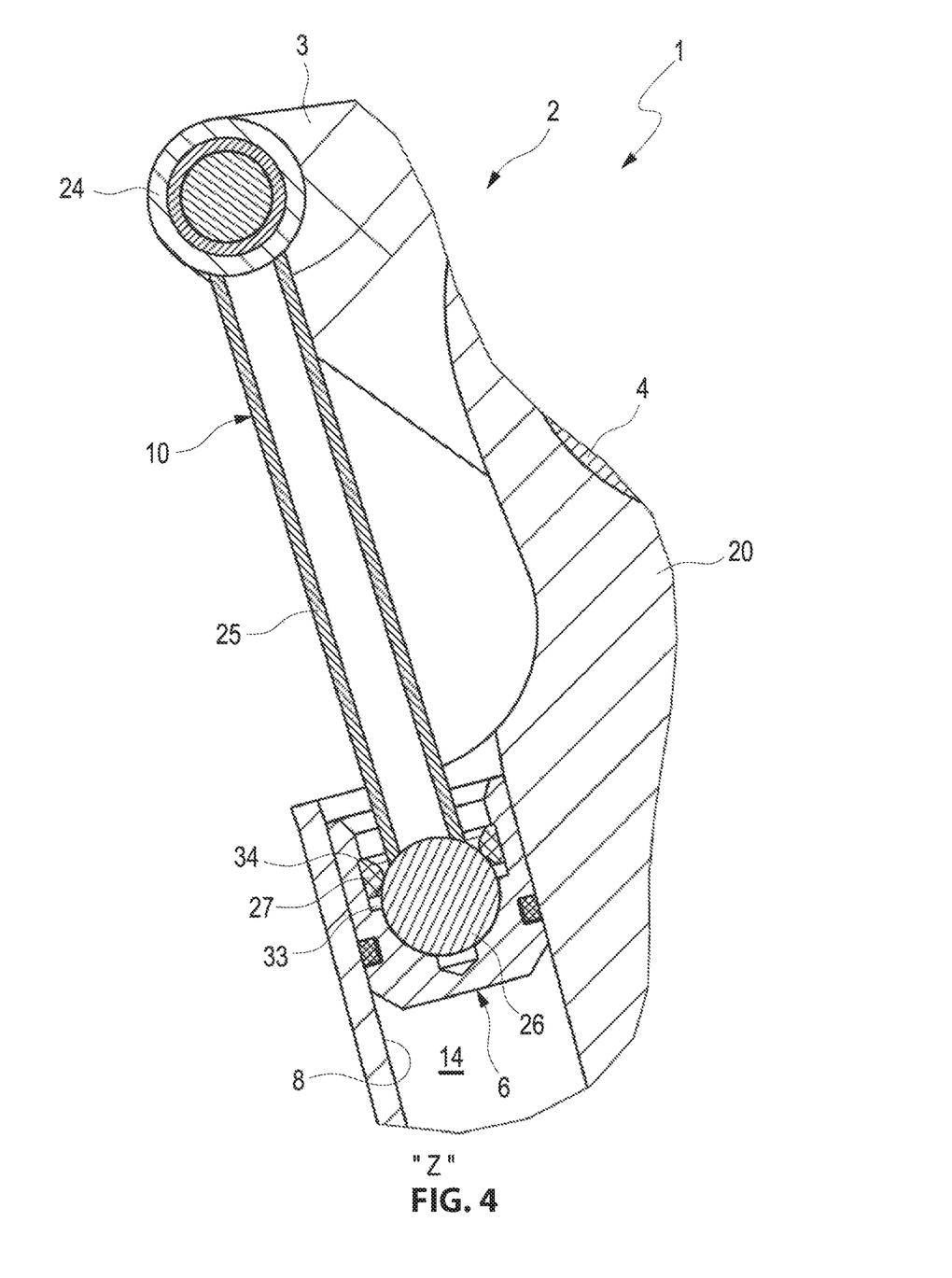
FIG. 4 illustrates an enlarged detail Z of the connecting rod according to FIG. 3.
Figure 5:
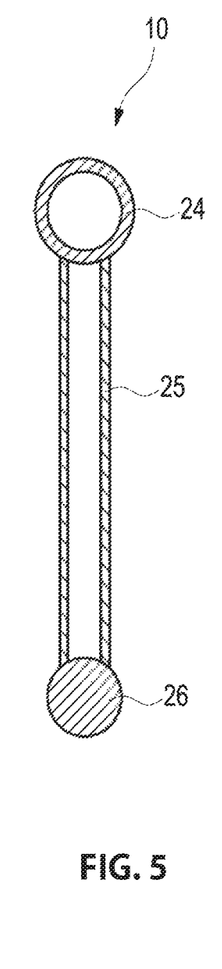
FIG. 5 illustrates the support rod of the connecting rod according to FIG. 1 in a longitudinal sectional view.

FIG. 4 illustrates a blown up view of a first embodiment of the connecting rod 1 with an optimized GKS support rod 10 that is illustrated in detail in FIG. 5. The invention is described in an exemplary manner with reference to the support rod 10 on the gas force side (GKS) of the connecting rod 1. Thus, the connecting rod 1 is in the high compression position $\varepsilon_{high}$. The embodiments are not limited to GKS support rod 10 but both support rods 10, 11 can be configured in the same way as a matter of principle.

The support rod 10 is configured from several components and configured as an assembled support rod. The support rod 10 includes the components pivot link element 24, rod element 25, and piston connector 26. The rod element 25 is connected at one end with the pivot link element 24 and at the other end with the piston connector 26. At least two of the components are connected with one another by a welding method, in particular a friction welding method. The piston connector 26 is configured as a ball.

The pivot link element 24 is configured as a sleeve whose longitudinal axis is configured perpendicular to the longitudinal axis of the rod element. In particular the pivot link element 24 can include an impressed bearing bushing.

As evident from FIG. 4 the rod element 25 is configured as a tube. Alternatively, a rod element can also be used that has a polygonal cross section or another profile for a surface area moment that is optimized for bending stiffness. Alternatively, the rod element 25 can be made from a solid material.

The spherical piston connector 26 is inserted into the piston. The support rod 10 is formed by a safety ring 27 which is supported by an undercut 34 that is arranged at a receiver 33 in the piston 6 so that the safety ring is secured against sliding out of the receiver 33. The safety ring 27 can also be configured partially open or slotted on its circumference. The safety ring 27 can be advantageously configured as a spring elastic ring that is supported in a radially outward direction at the piston 6.

Thus, a method for producing a connecting rod 1 includes at least the steps:—producing a support rod 10, 11 with a pivot link element 24, a rod element 25 and a piston connector 26,—attaching at least the pivot link element 24 or at least the piston connector 26 at least at one end of the rod element 25 with the pivot link element 24 or the piston connector 26, and—producing a fixed connection therewith.

The support rod 10, 11 is thus connected with the pivot link element 24, and/or connected by a welding method, in particular a friction welding method.

Alternatively, the rod element 25 can also be fabricated in one piece together with the pivot link element 24 or with the piston connector 26 and/or the piston connector 26 and the pivot link element 24 are connected as separate components with the rod element 25.

Figure 6:
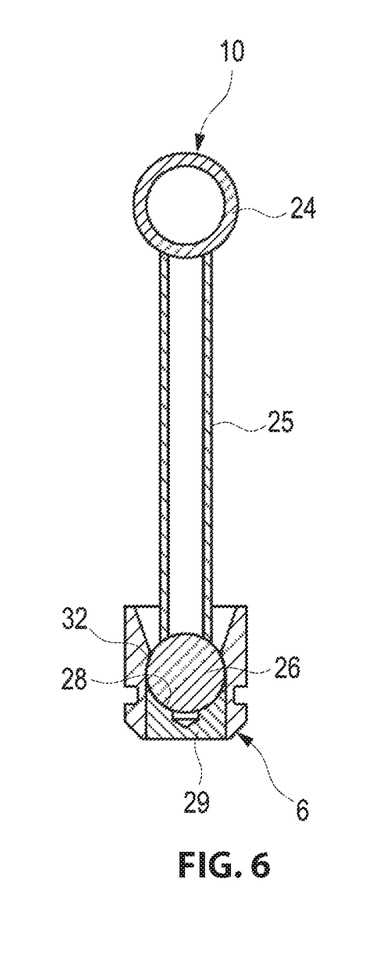
FIG. 6 illustrates a support rod according to a second embodiment with a connected piston in a longitudinal sectional view.
Figure 7:
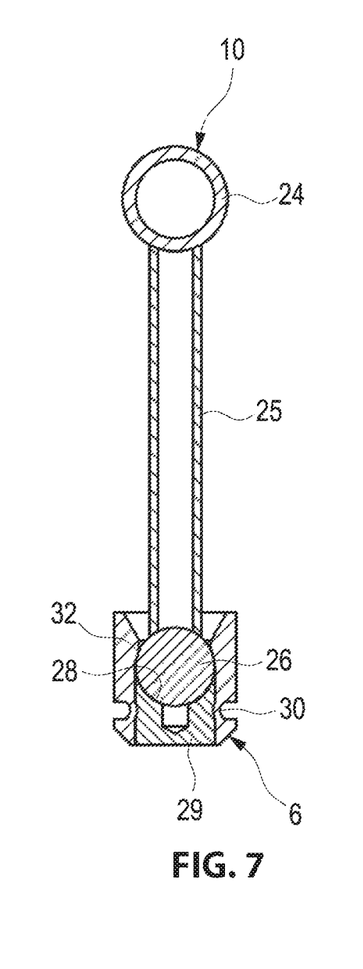
FIG. 7 illustrates a support rod according to a third embodiment with a connected piston in a longitudinal sectional view.
Figure 8:
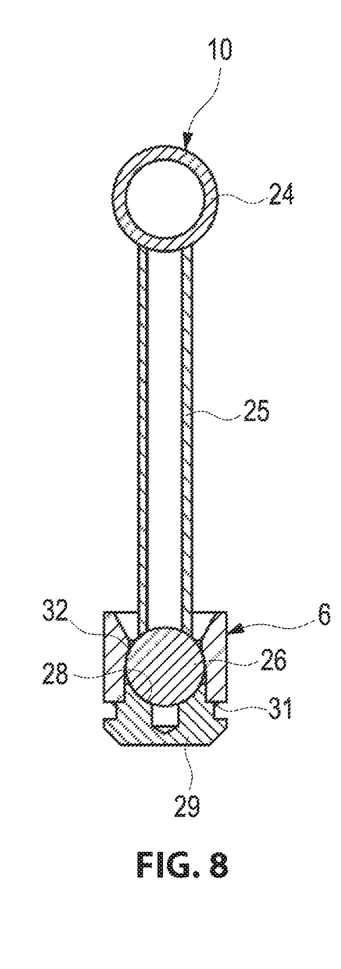
FIG. 8 illustrates a support rod according to a fourth embodiment with a connected piston in a longitudinal sectional view.

Three support rod assemblies without safety ring are illustrated in FIGS. 6 through 8.

FIG. 6 illustrates another embodiment of the support rod 10 with an impressed ball receiver 28. The ball receiver 28 is configured in a cover 29 which is pressed into the piston 6. Thus, initially the ball 26 is welded to the rod element 25. This assembly is inserted into the piston 6 which is configured as a piston bushing. The piston 6 includes an undercut 32 which secures the piston connector 26 against sliding out. The piston connector 26 is fixated in the piston 6 by a cover 29.

Before finishing the rod element 25 the piston 6 is slid onto the rod element 25 and the piston connector 26 with the slid-on piston 6 is connected with the rod element 25.

In the embodiment illustrated in FIG. 6 the cover 29 with the ball receiver 28 is pressed into the piston 6. This way a permanent connection can be established between the piston 6 and the cover 29 wherein the permanent connection is reliable during long term operations. Eventually the pivot link element 24 is welded down.

The next embodiment according to FIG. 7 shows a folded over piston 6 that differs from FIG. 6, in which folded over piston the cover 29 is attached by a fold over 30 of the piston 6 or the piston bushing.

The embodiment according to FIG. 8 provides to press the cover 29 into the piston bushing and to subsequently weld the cover to the piston bushing with a circumferential weld 31.

Figure 9:
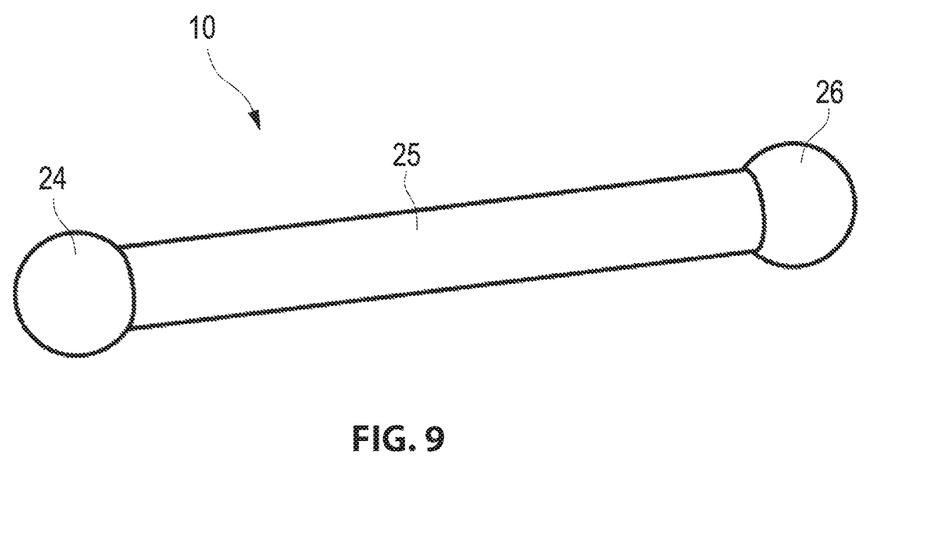
FIG. 9 illustrates a support rod according to another embodiment in an isometric view.
Figure 10:
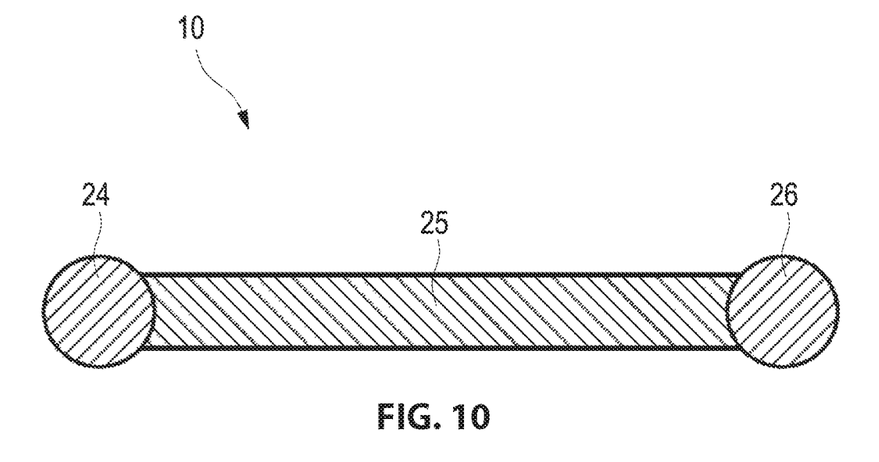
FIG. 10 illustrates the support rod according to FIG. 9 in a longitudinal sectional view.

As another embodiment illustrated in FIGS. 9 and 10 the support rod 10 includes a ball as a pivot element 24 and as a piston connector 26 which are respectively connected with respective ends of a rod element 25. This variant can be implemented especially well in combination with a one-piece eccentrical element lever 3 which has been produced by an MIM method or an investment casting method. Advantageously standard elements like hardened balls can be used for the pivot link element and the piston connector 26 and rods or tubes can be used for the rod element 25.

What is claimed is:

1. A connecting rod for a variable compression internal combustion engine, the connecting rod comprising:
    a crank bearing eye configured to connect the connecting rod to a crankshaft of the variable compression internal combustion engine;
    a connecting rod bearing eye configured to connect the connecting rod to a cylinder piston of the variable compression internal combustion engine; and
    an eccentrical element adjustment arrangement configured to adjust an effective connective rod length, which eccentrical element adjustment arrangement includes an eccentrical element that is connected torque proof with an eccentrical element lever,
    wherein the eccentrical element adjustment arrangement includes two hydraulic chambers respectively including a piston that is movably arranged in a cylindrical borehole and connected with a support rod which is connected with the eccentrical element lever at another end,
    wherein the support rod is configured from plural components,
    wherein the support rod is configured as an assembled support rod,
    wherein the support rod includes a rod element with a pivot link element arranged at one end and a piston connector arranged at another end, and
    wherein the rod element is connected with the pivot link element and the piston connector by a friction weld,
    wherein the piston connector is configured as a ball,
    wherein the rod element is configured as a tubular rod element,
    wherein the pivot link element is configured as a tubular sleeve whose longitudinal axis is configured perpendicular to a longitudinal axis of the tubular rod element, and wherein the tubular sleeve is welded to the tubular rod element by a friction weld,
    wherein the link element includes an impressed bearing bushing.

2. The connecting rod according to claim 1, wherein a cross section of the rod element is configured polygonal.

3. The connecting rod according to claim 1, wherein the piston connector is secured by a safety ring against sliding out of the piston.

4. The connecting rod according to claim 1,
    wherein the piston includes an undercut,
    wherein the piston connector is secured against sliding out of the piston, and
    wherein the piston connector is fixated in the piston by a cover.

5. The connecting rod according to claim 4, wherein the cover is connected with the piston by welding or folding or impressing.

6. The connecting rod according to claim 1, wherein the rod element is configured integrally in one piece with the pivot link element.

7. A method for producing the connecting rod according to claim 1, the method comprising the steps:
    producing a support rod including a pivot link element, a rod element and a piston connector;
    attaching at least the pivot link element or at least the piston connector at least at one end of the rod element; and
    establishing a fixed connection therewith.

8. The method according to claim 7, wherein the support rod is connected at least with the pivot link element or at least the piston connector by a friction welding method.

9. The method according to claim 7,
    wherein the rod element is produced integrally in one piece together with the pivot link element or the piston connector, or
    wherein the piston connector or the pivot link element is connected with the rod element as a separate component.

10. The method according to claim 7, wherein a piston is slid onto the rod element before finishing the rod element and the piston connector with the slid-on piston is connected with the rod element.

11. A variable compression internal combustion engine, comprising at least one connecting rod according to claim 1.

* * * * *